O. SERPEK.
PROCESS OF MANUFACTURE OF ALUMINUM NITRID.
APPLICATION FILED AUG. 12, 1915.
1,233,925.
Patented July 17, 1917.
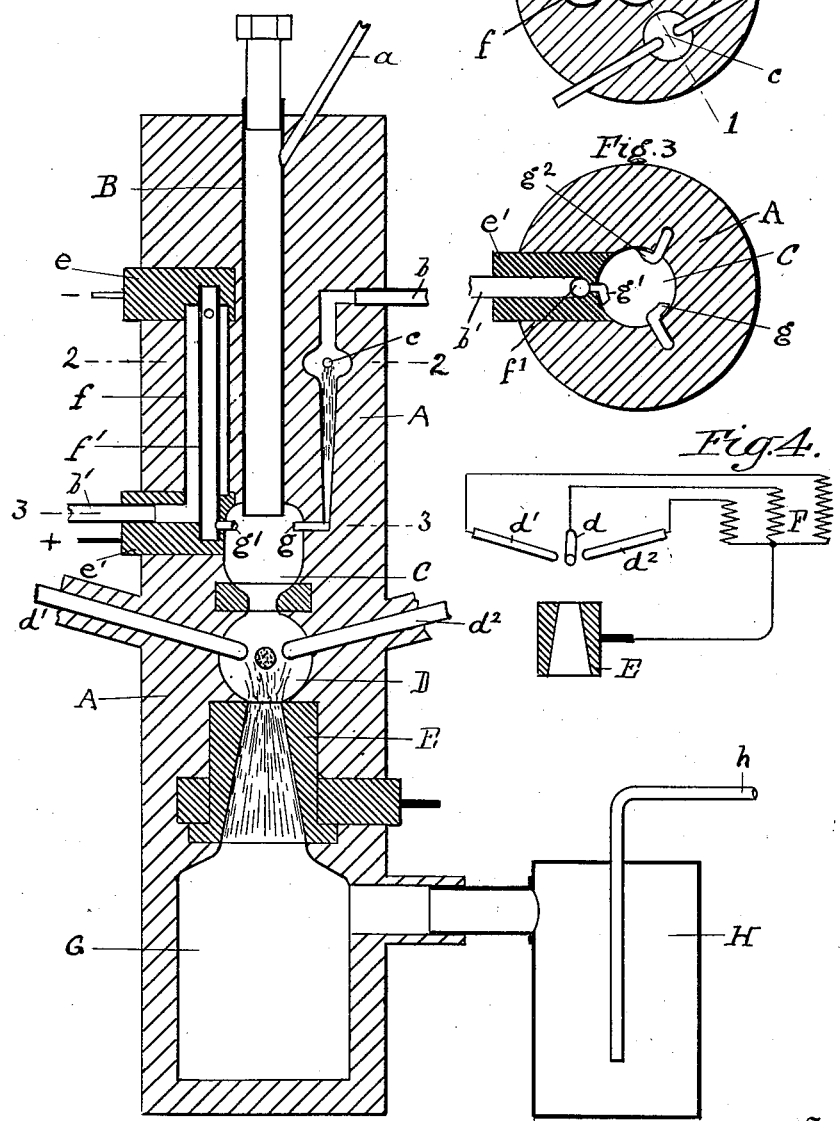
Inventor
Ottokar Serpek
By his Attorneys
Howson and Howson

UNITED STATES PATENT OFFICE.

OTTOKAR SERPEK, OF PARIS, FRANCE, ASSIGNOR TO SOCIÉTÉ GENERALE DES NITRURES, OF PARIS, FRANCE, A CORPORATION OF FRANCE.

PROCESS OF MANUFACTURE OF ALUMINUM NITRID.

1,233,925. Specification of Letters Patent. Patented July 17, 1917.

Application filed August 12, 1915. Serial No. 45,224.

*To all whom it may concern:*

Be it known that I, OTTOKAR SERPEK, a subject of the Emperor of Austria, and a resident of 12 Rue Roquépine, Paris, France, have invented a new and useful Process of Manufacture of Aluminum Nitrid, of which the following is a specification.

The object of the invention is to improve the process of manufacture of aluminum nitrid which consists in passing a mixture of carbon and alumina or aluminous bodies (such as bauxite, etc.) in the presence of nitrogen or gases containing nitrogen during a very short time, which may amount to fractions of a second, through an electric arc or flames or chambers brought to very high temperatures. In other words, the present invention relates to an improvement on processes such as form the subject of my Patents No. 1,212,119, dated January 9, 1917, and No. 1,217,842, dated February 27, 1917, wherein aluminous material and carbon are allowed to fall freely or are otherwise projected freely through a space filled with nitrogen and at a high temperature.

The improved process consists in the previous and separate heating of the gases containing nitrogen to a very high temperature, preferably approximating to or even greater than the temperature of reaction, before being brought in contact with the solid bodies and in then passing the mixture of gases and solids through an electric arc or other intense source of heat where the reaction takes place.

The gases containing nitrogen may be heated previously and separately by means of electric arcs of any kind, monophased or polyphased and of any voltage. Electric arcs of high voltage may preferably be employed giving long electric flames which increase the time of contact between the gases and the said flames in their passage through them.

The aforesaid previous and separate heating of the gases containing nitrogen may also be carried out by causing them to pass through chambers containing resistances heated up by electricity.

Again, the aforesaid heating of the gases containing nitrogen may be carried out by passing them through heat recuperating chambers such as are commonly used in blast and other furnaces. Generally the gases may be heated up by any known means, the essence of this invention being that the gases are brought separately and independently of the charge to a very high temperature before being mixed with the solid bodies with which they are intended to react, and that the mixture of solids and gases is afterward injected or blown through an electric arc or other intense source of heat.

The solids may likewise be previously and separately heated before being passed through the arc in which the reaction takes place.

This preheating of the solids occurs naturally in the case when the channel through which they pass into the reaction chamber is in close proximity to the gas heating chambers, through the sides of the said channel being heated by conduction.

In the accompanying drawing there is represented, by way of example, an apparatus adapted for the carrying out of the process which forms the subject of my present invention.

Figure 1 is a vertical section of the apparatus on the line 1—1—1 of Fig. 2.

Fig. 2 is a horizontal section of the apparatus on the line 2—2.

Fig. 3 is a horizontal section of the apparatus on the line 3—3 of Fig. 1.

Fig. 4 is a diagram of the electrical connections.

The apparatus comprises a cylinder of highly refractory material A containing along its axis a tube B through which the mixture of solids (carbon and bauxite) falls freely, a mixing chamber C where the solids and gases containing nitrogen are intimately mixed together, and a chamber D in which an electric arc is produced between the electrodes $d$, $d'$, $d^2$, connected to a triphase current in the present example. The chamber C is connected with the chamber D by a passage constricted so as to direct the mixture toward the axis of the latter chamber. Chamber D leads into a carbon passage E, the upper opening of which is also constricted. Chamber D and passage E form together the reaction chamber.

$a$ is the tube through which the solids are passed into the axial tube, $b$ $b$ the passages or conduits through which the gases containing nitrogen are led into the preheating chambers. These chambers may be arranged in different ways.

For example, a high voltage electric arc $c$ (see right hand of Fig. 1) may be placed in a small chamber formed at a point along the gas conduit, the latter being constricted below the chamber so as to lengthen the arc blown by the gaseous current.

Again, the gas may be passed through tubes $f$ $f'$ connected by blocks $e$ $e'$ to the electric current, and forming heating resistances (see left hand of Fig. 1).

In this arrangement, the gas arriving through $b'$, passes upward in to the annular space left between the tubes $f$ $f'$, through holes left in the upper part of the inner tube $f'$ and down through the latter to chamber C, after being heated up to the requisite high temperature. The several preheating chambers are connected to chamber C by conduits $g$, $g'$, $g^2$ bent horizontally in the same direction (see Figs. 1 and 3) so as to cause whirls to form and insure a thorough mixing of the solids falling through B with the heated gases.

In order to insure the stability of the arc, the neutral point of the generator or transformer producing the triphased arc is connected to the tubular piece E within which the arc is blown by the gaseous current.

The hollow piece E may be constricted more or less, at its orifice, or at some point in its length so as to insure its being completely filled with the arc flame, so that the whole of the charge is compelled to pass through the arc and is subjected to its action as fully as possible. Further, by suitably proportioning the size of the opening and the length of the piece E, the velocity of the gaseous current which carries the solid matter, as well as the voltage and intensity of the electric current, it is possible to regulate the temperature within the piece E, so that the reaction may take place under the most economical conditions.

The apparatus is connected at its base with a collecting chamber G which receives the aluminum nitrid produced. This chamber is connected to a dust gathering chamber or device H which collects the fine particles of nitrid carried by the current of gas the latter escaping through the pipe $h$. This gas which contains carbon monixid may be used to heat the nitrogen before it passes within the preheating chambers.

In the following claims, the term "nitrogen" is used in a sufficiently general sense to include either nitrogen as such or gases containing nitrogen. Also the expression "aluminous material" is here used in a sufficiently general sense to include either alumina or material containing alumina, as for example, bauxite.

I claim as my invention:—

1. As an improvement in the process of obtaining aluminum nitrid by heating aluminous material and carbon in an atmosphere containing nitrogen, the process herein described of heating the nitrogen to a very high temperature before it is brought into the presence of the mixture of aluminous material and carbon and causing said mixture in powdered form to be projected freely and at relatively high velocity through an intensely heated space in the presence of the previously heated nitrogen.

2. As an improvement in the process of obtaining aluminum nitrid by heating aluminous material and carbon in an atmosphere containing nitrogen, the process herein described of heating the nitrogen to a very high temperature before it is brought into the presence of the mixture of aluminous material and carbon and causing said mixture in powdered form to be projected freely and at relatively high velocity through an electric arc in the presence of the previously heated nitrogen.

3. As an improvement in the process of obtaining aluminum nitrid by heating aluminous material and carbon in an atmosphere containing nitrogen, the process herein described of heating the nitrogen to a very high temperature before it is brought into the presence of the mixture of aluminous material and carbon and causing said mixture in powdered form to fall freely and at relatively high velocity through an electric arc in the presence of the previously heated nitrogen.

4. As an improvement in the process of obtaining aluminum nitrid by heating aluminous material and carbon in an atmosphere containing nitrogen, the process herein described of heating the nitrogen to a very high temperature before it is brought into the presence of the mixture of aluminous material and carbon and causing said mixture in powdered form and the previously heated nitrogen to pass freely and rapidly in a gyratory path through an electric arc.

5. As an improvement in the process of obtaining aluminum nitrid by heating aluminous material and carbon in an atmosphere containing nitrogen, the process herein described of heating the nitrogen to a very high temperature before it is brought into the presence of the mixture of aluminous material and carbon and causing said mixture in powdered form together with the nitrogen to pass freely and rapidly through a lengthened electric arc.

In testimony whereof I have signed my name to this specification, in the presence of two subscribing witnesses.

OTTOKAR SERPEK. [L. S.]

Witnesses:
 CUARLES WREN,
 CHAS. P. PRESSLY.